(12) United States Patent
Matsuoka

(10) Patent No.: US 12,470,825 B2
(45) Date of Patent: Nov. 11, 2025

(54) IMAGING APPARATUS, CONTROL METHOD OF IMAGING APPARATUS, AND COMPUTER PROGRAM

(71) Applicant: CANON KABUSHIKI KAISHA, Tokyo (JP)

(72) Inventor: Keisuke Matsuoka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 349 days.

(21) Appl. No.: 18/299,227

(22) Filed: Apr. 12, 2023

(65) Prior Publication Data

US 2023/0345128 A1 Oct. 26, 2023

(30) Foreign Application Priority Data

Apr. 21, 2022 (JP) ................................. 2022-070224

(51) Int. Cl.
| | |
|---|---|
| *H04N 23/695* | (2023.01) |
| *G06V 10/00* | (2022.01) |
| *H04N 23/611* | (2023.01) |
| *H04N 23/69* | (2023.01) |

(52) U.S. Cl.
CPC ........... *H04N 23/695* (2023.01); *G06V 10/00* (2022.01); *H04N 23/611* (2023.01); *H04N 23/69* (2023.01)

(58) Field of Classification Search
CPC .... H04N 23/695; H04N 23/611; H04N 23/69; H04N 23/61; G06V 10/00
USPC ................................ 455/456.1; 342/450–465
See application file for complete search history.

(56) References Cited

U.S. PATENT DOCUMENTS

| | | | | |
|---|---|---|---|---|
| 11,381,782 B2* | 7/2022 | Oami | ................... | H04N 23/695 |
| 2016/0048976 A1* | 2/2016 | Kwon | ................... | H04N 23/632 |
| | | | | 382/103 |
| 2019/0373169 A1* | 12/2019 | Nakayama | ............. | H04N 23/95 |
| 2021/0241467 A1* | 8/2021 | Lee | ........................ | G06V 20/10 |

FOREIGN PATENT DOCUMENTS

JP 2004-040170 A 2/2004

OTHER PUBLICATIONS

Pau et al., Bluetooth 5.1: An Analysis of Direction Finding Capability for High-Precision Location Services, Sensors 2021, 21, 3589, p. 1-16 (Year: 2021).*

* cited by examiner

*Primary Examiner* — Sam K Ahn
(74) *Attorney, Agent, or Firm* — Cowan, Liebowitz & Latman, P.C.

(57) ABSTRACT

An imaging apparatus communicates with a wireless terminal held by an object, includes a first detection unit configured to detect a position of the wireless terminal based on radio waves direction received from the wireless terminal; a second detection unit configured to detect the object position based on image data; a tracking unit configured to control the imaging apparatus to track a position detected by the first or second detection unit; a determination unit configured to determine a stability of detection; and a control unit configured to, if the stability of detection by one from among the first and second detection units is less than a first value, cause the other detection unit to operate, and configured to stop the operation of the one detection unit if the stability of the other detection unit is a second value or above.

16 Claims, 11 Drawing Sheets

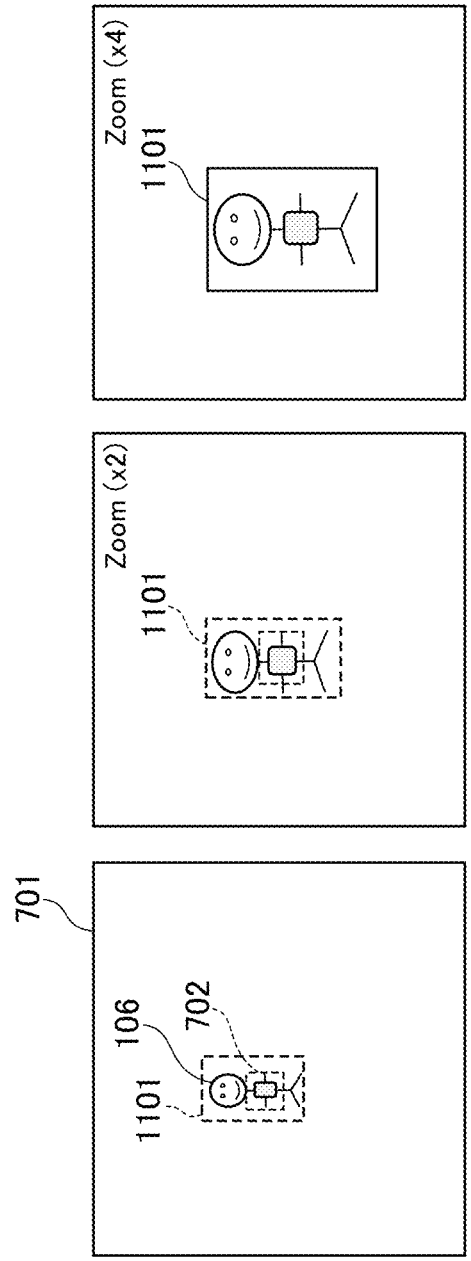

IMAGING APPARATUS, CONTROL METHOD OF IMAGING APPARATUS, AND COMPUTER PROGRAM

BACKGROUND OF THE INVENTION

Field of the Invention

The present invention relates to an imaging apparatus, a control method of an imaging apparatus, a computer program, and the like.

Description of the Related Art

Network cameras that can control panning, tilting, and zooming, and the like are conventionally known. Some of these cameras are equipped with a function for automatically controlling an imaging direction based on the position of a person (automatic tracking) so that an object is captured in an image.

Although image analysis (image recognition), for example, human body detection, is often used to identify the position (position identification) of a person, detection cannot be performed and the state becomes unstable depending on the imaging environment and the state of the objects in the video image, such as color changes due to lighting fluctuations and the orientation and posture of a person. In contrast, in recent years, in Bluetooth (registered trademark) version 5.1, which is a wireless communication standard, specifications related to a function that can detect an incoming direction of radio waves (radio wave direction) (direction detection) have been added.

By installing a wireless communication module that conforms to an appropriate specification in, for example, both a camera and a wireless terminal, and specifying the direction of the radio waves from the wireless terminal using the camera, the direction of the wireless terminal (position in the screen) can be specified. It is then possible for the camera to identify the position of an object by having the object hold the wireless device in advance. However, in this method, the radio direction cannot be identified, and the position identification becomes unstable when the communication distance is restricted, or when radio interference occurs.

Japanese Patent Application Laid-Open No. 2004-40170 discloses a configuration that automatically switches between a single wireless positioning method and a wireless positioning method using a server according to the radio wave receiving intensity (radio wave intensity).

In Japanese Patent Application Laid-Open No. 2004-40170, in an actual scene, there are cases in which, due to the communication distance, radio wave interference, or other problems, the radio wave intensity is lower than the expected intensity, and even if the wireless positioning methods are switched according to a predetermined rule, the unstable state is not necessarily improved.

In view of these drawbacks, an object of the present invention is the provision of an imaging apparatus capable of stably acquiring the direction of an object during tracking control based on radio waves and video images.

SUMMARY OF THE INVENTION

An imaging apparatus of one aspect of the present invention is an imaging apparatus capable of communicating with a wireless terminal held by an object, the image capturing unit comprising: at least one processor or circuit configured to function as:
a first detection unit configured to detect a position of the wireless terminal based on a direction of radio waves received from the wireless terminal held by the object; a second detection unit configured to detect a position of the object based on image data obtained by an imaging unit; a tracking unit configured to control the imaging apparatus so that a position detected by the first detection unit or the second detection unit is tracked; a determination unit configured to determine a stability of detection by the first and second detection units; and a control unit configured to, if the stability of detection by one detection unit from among the first and the second detection units is determined to be less than a first value by the determination unit, cause the other detection unit to operate, and configured to stop the operation of the one detection unit if the stability of the other detection unit is determined to be a second value or above by the determination unit.

Further features of the present invention will become apparent from the following description of embodiments with reference to the attached drawings.

BRIEF DESCRIPTION OF THE DRAWINGS

FIGS. 11A to 11C are drawings for explaining the operation of the processing for improving the accuracy of stability determination in human body detection according to the third embodiment.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate descriptions will be omitted or simplified.

Note that, in the embodiments, an example of application to a network camera serving as an imaging apparatus will be described. However, the imaging apparatus also includes an electronic device and other devices having an imaging function, such as digital cameras, cameras for broadcast stations, in-vehicle cameras, drone cameras, and cameras mounted on robots.

First Embodiment

Figure 1:
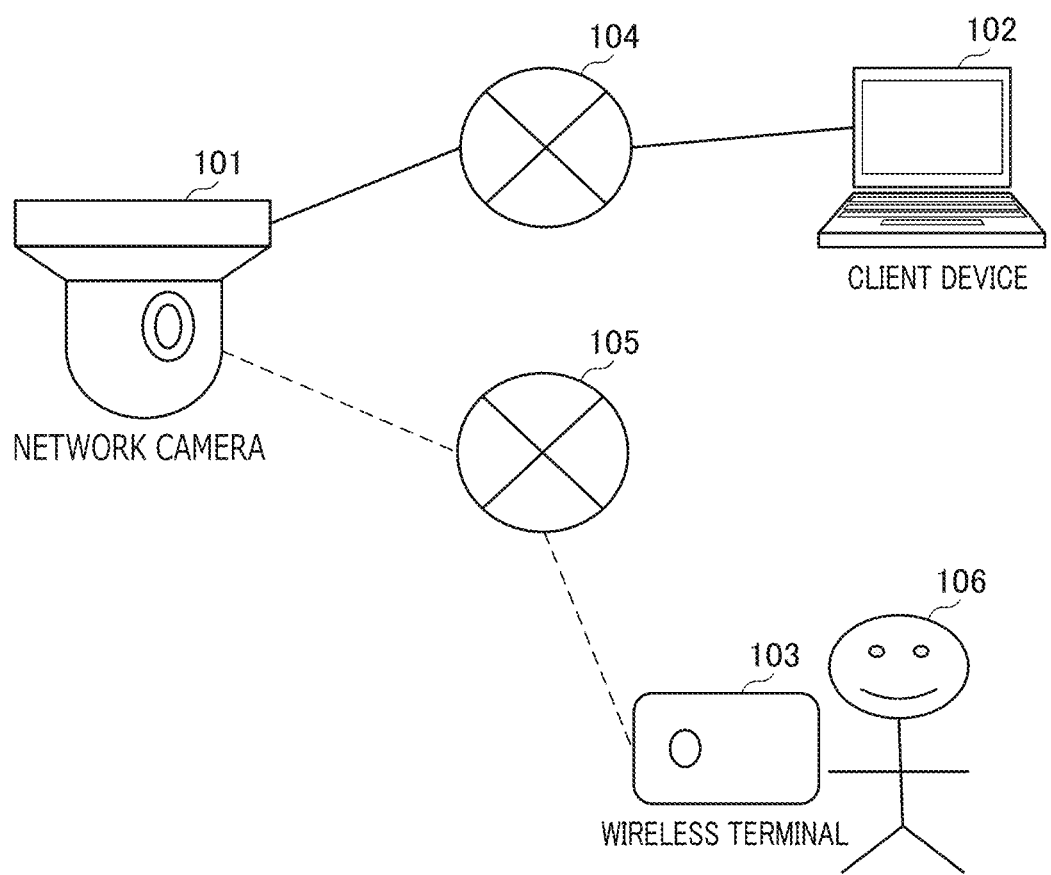
FIG. 1 is a schematic diagram showing a configuration example of a network camera system in the first embodiment.

FIG. 1 is a schematic diagram showing a configuration example of the network camera system in the first embodiment. The network camera system in the first embodiment includes a network camera 101, a client device 102, and a wireless terminal 103, and is configured by a network 104 and a wireless network 105.

The network camera 101 is capable of streaming video images or controlling the camera via a wired or wireless network. Additionally, the network camera 101 that serves as an imaging apparatus can communicate with the wireless terminal 103 held by an object 106.

The client device 102 is connected to the network camera 101 via the network 104 and acquires images from the network camera 101 and controls the network camera 101 via a browser.

A wireless communication module conforming to a direction detection function with a Bluetooth (registered trademark), for example, 5.1, specification is built-into the wireless terminal 103, and the wireless terminal 103 is connected to the network camera 101 via the wireless network 105.

Note that, in the first embodiment, it is assumed that the wireless terminal 103 is held by the object 106 so that the object 106 is automatically tracked by the network camera 101.

The network 104 is a network for streaming video images captured by the network camera 101 to external recording servers, client terminals, and the like. Note that the wireless network 105 may be a wired LAN.

The wireless network 105 enables the network camera 101 and the wireless terminal 103 to communicate with each other in accordance with wireless communication standards such as Bluetooth (registered trademark), Z-Wave (registered trademark), Zigbee (registered trademark), or UWB (Ultra Wide Band).

Figure 2:
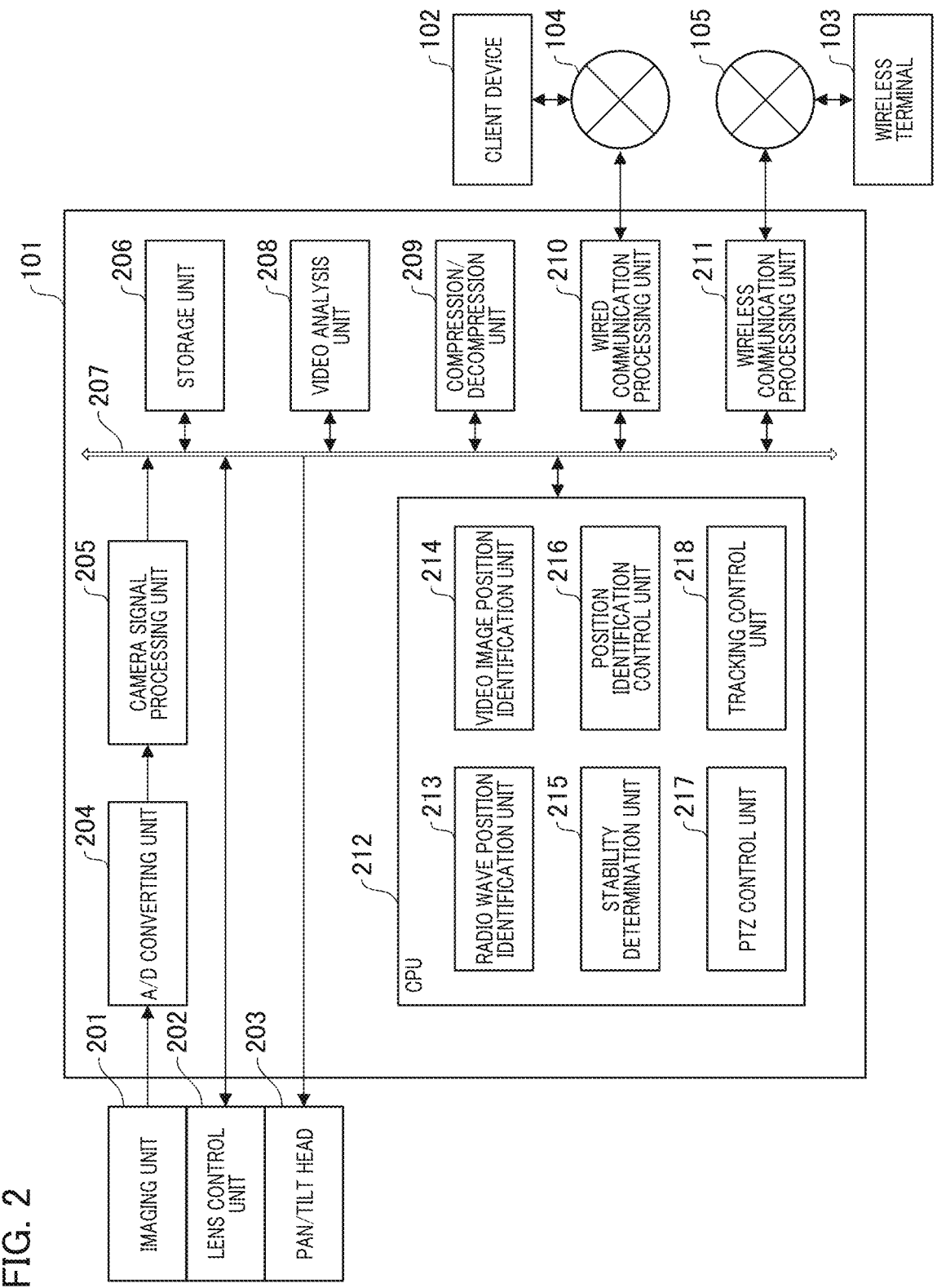
FIG. 2 is a functional block diagram showing an example of the configuration of the network camera according to the first embodiment.

FIG. 2 is a functional block diagram showing one example of the configuration of a network camera according to the first embodiment. Note that some of the functional blocks shown in FIG. 2 are realized by having a CPU 212 serving as a computer in the imaging apparatus execute a computer program that is stored in a storage unit 206 serving as a storage medium.

However, some or all of these may be realized by hardware. A dedicated circuit (ASIC), a processor (reconfigurable processor, DSP), and the like can be used as the hardware. Additionally, each of the functional blocks shown in FIG. 2 are not necessarily built into the same casing and may be configured by separate devices that are connected to each other via a signal line.

The network camera 101 includes an imaging unit 201, a lens control unit 202, and a pan/tilt head 203. The imaging unit 201 includes a zoom lens, a focus lens, an iris diaphragm, and an imaging element, and the like. The zoom lens and the focus lens move along the optical axis using the lens control unit 202, and the iris diaphragm operates by being driven by the lens control unit 202.

The image element photoelectrically converts light that has passed through the zoom lens, the focus lens, and the iris diaphragm, and generates an analog image signal. After amplification processing by sampling is performed on the generated analog image signal, the signal is output to an A/D converting unit 204.

The pan/tilt head 203 includes a pan driving unit and a tilt driving unit, and can rotate the imaging unit 201 in the horizontal and vertical directions by being controlled via an actuator (not illustrated).

The A/D converting unit 204 converts analog image signals to digital image signals and outputs the digital image signals to the camera signal processing unit 205.

The camera signal processing unit 205 performs various image processing on the digital image signals and generates video image signals. The various image processing includes, for example, offset processing, gamma correction processing, gain processing, RGB interpolation processing, noise reduction processing, and color tone correction processing.

The storage unit 206 includes a RAM, a ROM, a storage device, and the like (not illustrated). The RAM is a volatile memory such as SRAM or DRAM, while the ROM is a nonvolatile memory, for example, EEPROM or a flash memory. The storage device is, for example, a hard disk drive (HDD) or a solid-state drive (SSD).

Computer programs for realizing a function related to the first embodiment and data used when the computer programs are executed are stored in the ROM or in the storage device. These computer programs and data function as the units according to the first embodiment by being captured into the RAM appropriately via the bus 207 under the control of the CPU 212 and executed by the CPU 212.

A video image analysis unit 208 is a processing unit that analyzes video images and performs various detection processing such as human body (body) detection, face detection, and moving object detection. In the first embodiment, although human body detection, which detects a human body in an image frame, is used as one example of video image analysis for identifying the position of the object 106, the present invention is not limited thereto.

For example, face detection or moving-object detection may be used. That is, any detection may be used if the direction of the object is detected by detecting a body or a face of the object, or a moving object, and the like during the identification of the position of the object by video image analysis. Note that the objects are not limited to humans, and the objects may be animals including pets and domestic animals, various moving objects, factory parts, and others. The video image analysis results are notified to the CPU 212 via the bus 207.

A compression/decompression unit 209 performs the compression processing on the captured images in accordance with control instructions from the CPU 212 via the bus 207 to generate compressed data. Alternatively, the decompression processing is performed on the compressed data. A wired communication processing unit 210 performs network communication to and from the client device 102 via the network 104.

A wireless communication processing unit 211 performs wireless communication processing to and from the wireless terminal 103 via the wireless network 105. In the first embodiment, although the wireless communication processing unit 211 is assumed to include a wireless communication module conforming to Bluetooth (registered trademark) 5.1 specifications, the present invention is not limited thereto. For example, a wireless communication module may be connected externally using a general-purpose interface, for example, a USB.

The CPU 212 is a central processing unit and functions as a computer. The CPU 212 has functional blocks such as a radio wave position identification unit 213, a video image position identification unit 214, a stability determination unit 215, a position identifying control unit 216, a PTZ control unit 217, and a tracking control unit 218 according to the first embodiment. A description will be given of each unit.

The radio wave position identification unit 213 detects a direction of the radio waves emitted from the wireless terminal 103 and identifies the relative direction of the wireless terminal 103 as viewed from the network camera 101 (a position on the image). The radio wave position identification unit 213 functions as a first detection unit that detects the direction (position on the image) of radio waves received from the wireless terminal 103.

The method for identifying the position is performed based on the direction detection function conforming to the Bluetooth (registered trademark) 5.1 specification, and the details thereof will be explained in FIG. 3. Note that position identification in the first embodiment means identifying the position of the object on the screen by identifying at least the direction of the object.

The video image position identification unit 214 performs image recognition through the video image analysis unit 208 and identifies the direction of the object 106 within the image frame (position on the image) based on the human body detection resulting from the image recognition. The video image position identification unit 214 functions as a second detection unit that detects a direction (position on the image) of the object based on image data obtained by the imaging unit 201.

The stability determination unit 215 determines the stability of the position identification in the radio wave position identification unit 213 and the video image position identification unit 214. The stability determination unit 215 functions as a determination unit that determines the stability of detection performed by the first and second detection units.

Here, stability is an index indicating whether or not the position of the object can continuously be captured during automatic tracking, and the stability is determined based on a predetermined rule (a stability determination rule) that takes into consideration the characteristics of each of the position identifying methods. Details of the stability determination rule will be described in the explanation regarding FIG. 4 and the subsequent drawings. When the stability determination rule is satisfied, the position identification is determined to be stable, and when the stability determination rule is not satisfied, the position identification is determined to be unstable. Note that stability in the first embodiment can also be referred to as "reliability".

The position identifying control unit 216 controls the operation of the radio wave position identification unit 213 and the video image position identification unit 214, based on the determination result of the stability determination unit 215. For example, when the position identification by the radio wave position identification unit 213 is unstable, position identification using the video image position identification unit 214 is temporarily executed. When the position identification by the video image position identification unit 214 is determined to be stable, control is performed so as to execute the position identification using the video image position identification unit 214.

The PTZ control unit 217 acquires the position of the object that has been acquired by position identification by the radio wave position identification unit 213 or the video image position identification unit 214, which are executed by the position identifying control unit 216. The PTZ control unit 217 then controls the driving of the tilt, and zoom (hereinafter, referred to as "PTZ drive") by using the lens control unit 202 and the pan/tilt head 203, based on the acquired position of the object.

The PTZ driving is then controlled so that the imaging direction of the camera is directed to the position of the object 106, and consequently, automatic tracking of the object 106 becomes possible.

The tracking control unit 218 performs the control for the overall processing for the automatic tracking. Specifically, the tracking control unit 218 performs the settings of the start and end of the automatic tracking processing or performs the settings of the position identifying method that is prioritized at the start of the processing, and the like. Additionally, the tracking control unit 218 functions as a tracking unit that controls the imaging apparatus so that the direction detected by the first detection unit or the second detection unit is tracked.

Note that, in the first embodiment, although the tracking control unit 218 performs tracking by controlling panning or tilting, the tracking unit includes, for example, a tracking unit that performs tracking by shifting a display screen so that an object that has moved to the edge of the display screen moves to the center of the display screen (in-screen tracking).

Figure 3:
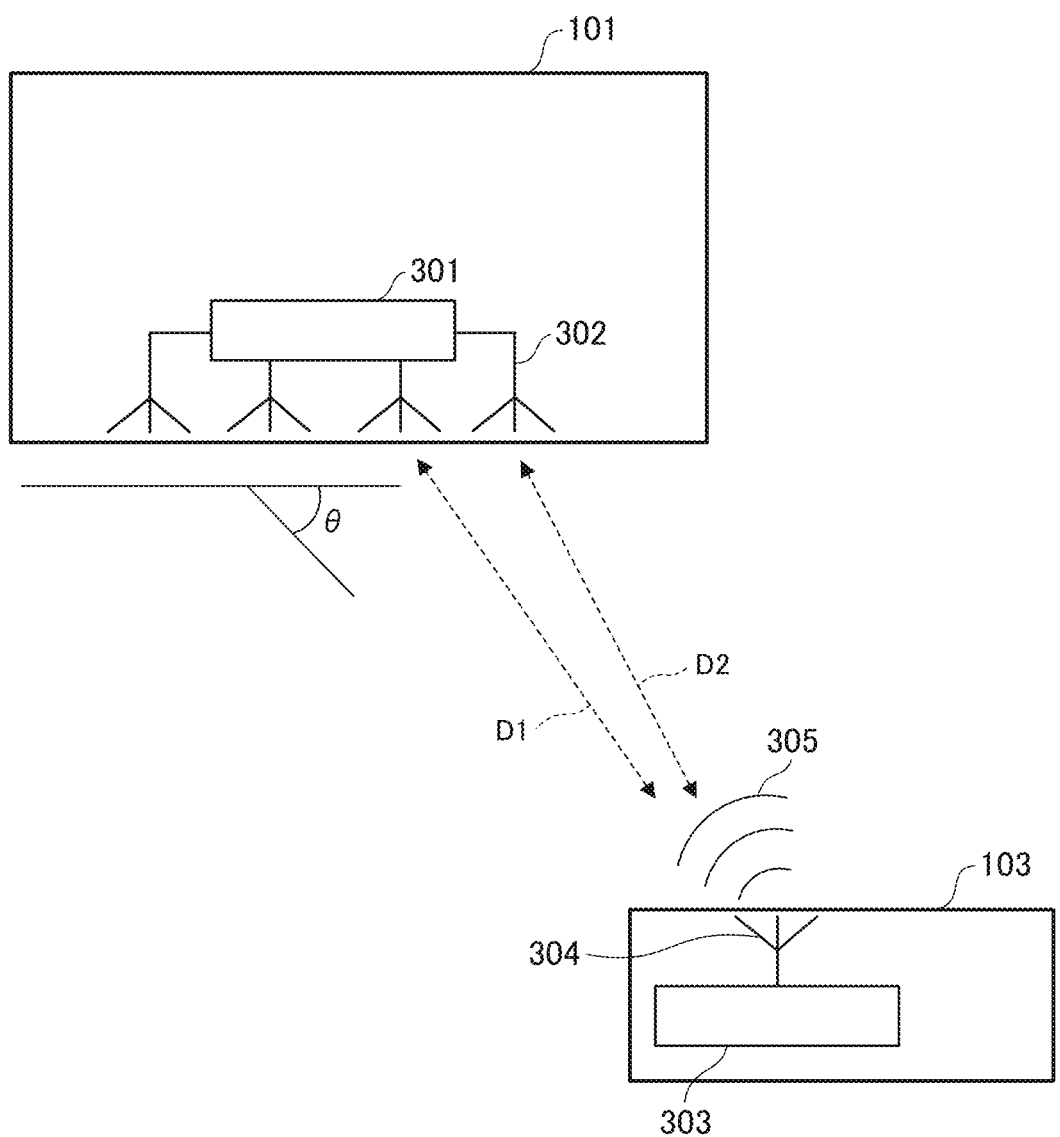
FIG. 3 is a drawing for explaining the principle of identifying the radio wave direction from a wireless terminal 103 in the network camera in the first embodiment.

FIG. 3 is a drawing for explaining the principle of identifying the radio wave direction from the wireless terminal 103 with the network camera 101 in the first embodiment. In the direction detection function with the Bluetooth (registered trademark) 5.1 specification, the incoming direction of radio waves is detected by using an antenna array having a plurality of antennas and utilizing the phase difference in the radio waves that are caused by the antennas that are respectively located at different locations. As the detection method, there are the two methods described below.

The first method is a method referred to as "Angle Of Arrival (AoA)", in which the reception angle of the radio wave is calculated at the receiving device side. The second method is a method referred to as "Angle Of Departure (AoD)", in which the emission angle is calculated at the transmitting device side and is transmitted it to the receiving device.

In the first embodiment, although the wireless terminal 103 is positioned on the transmitting device side and the network camera 101 is positioned on the receiving device side, and direction detection is performed by AoA, AoD may alternatively be used. The principle of specifying the radio wave direction by the network camera 101 will be briefly explained below with reference to FIG. 3.

The network camera 101 has a receiver 301 and a plurality of antennas 302, while the wireless terminal 103 has a transmitter 303 and a single antenna 304. Then, special radio waves 305 including a direction detection signal are transmitted from the antenna 304 by the transmitter 303, and the antennas 302 of the network camera 101 receive the special radio waves 305.

At this time, as shown in the drawing, the antennas 302, which are arranged at equal intervals, each receive the radio waves 305. Since there is a difference in distance between the antenna on the transmitting side and the antenna on the receiving side, which are denoted by a distance D1 and a distance D2, a signal with a different phase is detected for each antenna.

The receiver 301 then acquires modulation signals (IQ modulation signals), which have in-phase phase components and orthogonal phase components as radio wave phase information, while switching active antennas. Subsequently, the network camera 101 can calculate the incident angle θ, which is the relative incoming direction of the signals, based on the IQ modulation signal. The calculation method is performed by using the wavelength of radio waves, the distance between antennas, and the phase differences, however this method is publicly known, and the explanation thereof will therefore be omitted.

Then, the network camera 101 can obtain the orientation of the current camera in a three-dimensional space by calibration performed during the installation, so that it becomes possible to identify the direction of the wireless terminal 103 based on the direction of radio waves received from the wireless terminal 103. Then, the position of the wireless terminal within the screen can be identified when the direction of the wireless terminal 103 can be identified.

As described above, identifying the position in the first embodiment means identifying the position of the wireless terminal 103 or the person within the screen by identifying the direction of the wireless terminal 103 or the person relative to the network camera 101.

Note that the position (distance) of the wireless terminal 103 may also be identified by arranging the antennas 302 in FIG. 3 in the right and left directions so that the angles of the radio waves incident on each of the antennas are different. Alternatively, the position of the wireless terminal may be determined by estimating the distance to the wireless terminal according to the received electric wave intensity.

Figure 4:
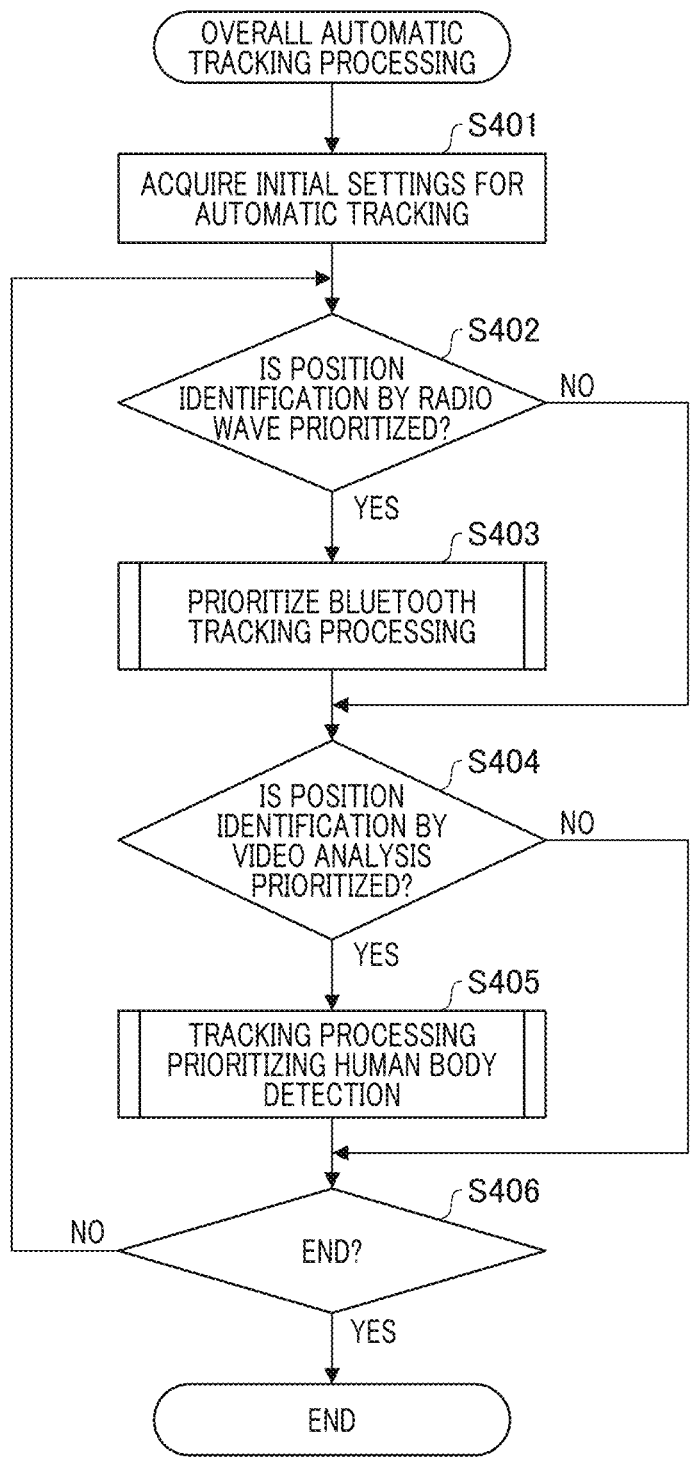
FIG. 4 is a flowchart showing the control method flow of the network camera in the first embodiment.

FIG. 4 is a flowchart showing the flow of the control method for the network camera 101 in the first embodiment. Note that the operation of each step in the flowchart in FIG. 4 is performed by the CPU 212, which serves as the computer in the network camera 101, executing a computer program stored in the storage unit 206.

In step S401, the tracking control unit 218 acquires the initial settings for an automatic tracking operation. The contents of the initial settings include the determination of the object to be tracked and the priority position identifying method which is to be prioritized for use at the start of automatic tracking. In the first embodiment, the priority position identifying method is the position identifying method that is used from the start of automatic tracking until the position of the tracked object becomes unstable.

In the first embodiment, as the priority position identifying method, either of the Bluetooth (registered trademark) 5.1 specification position identifying method or the method for identifying the position resulting from human body detection through video image analysis can be set. Note that the contents of the initial settings may be determined in advance, or they may be determined according to input from the client device 102.

In step S402, the tracking control unit 218 determines whether or not the radio position identifying method by radio waves is to be set as the priority position identifying method. If position identification by radio waves is set as the priority position identifying method, the process proceeds to step S403. If the result is "NO", the process proceeds to step S404.

Figure 5:
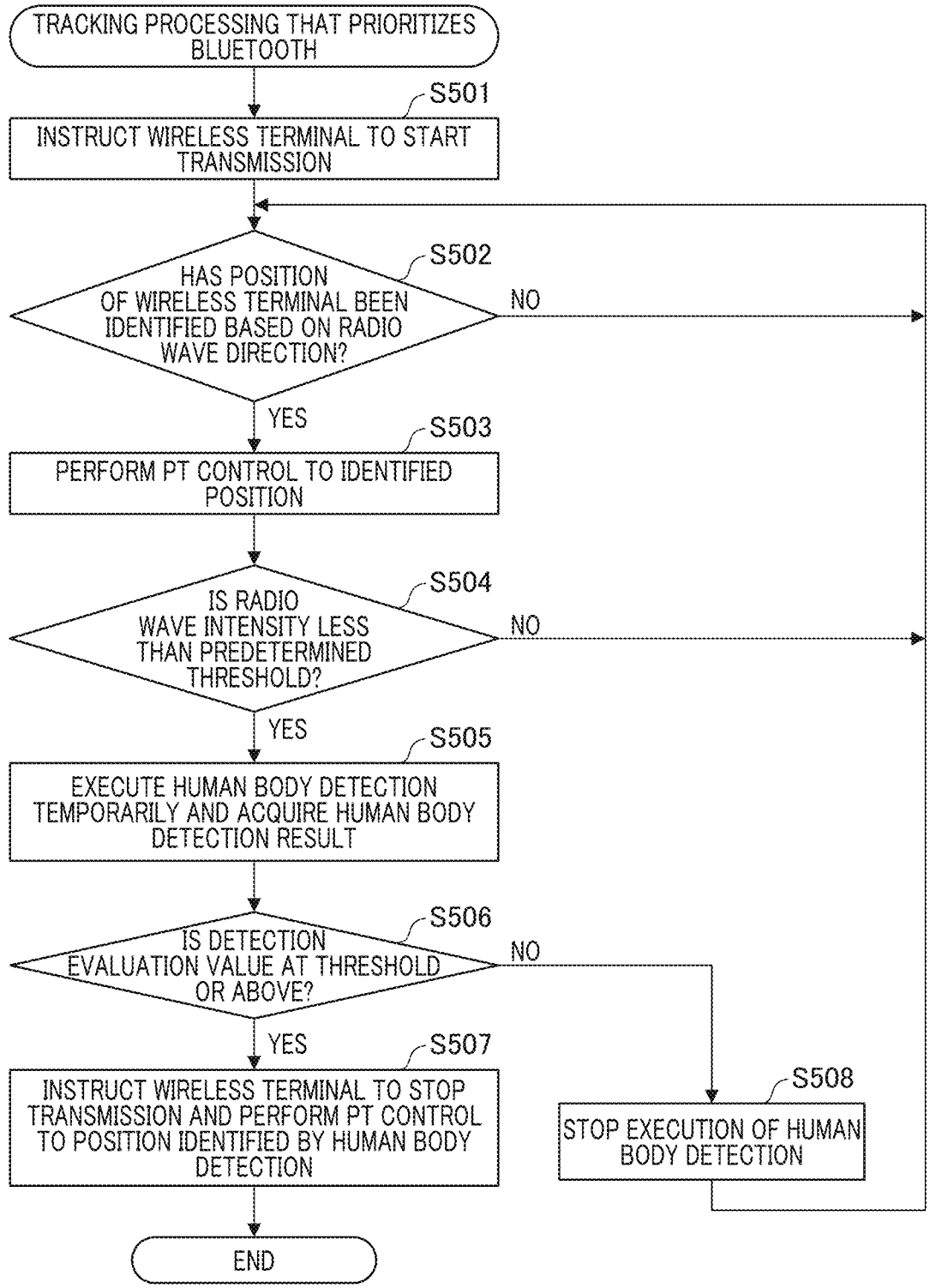
FIG. 5 is a flow chart showing an example of automatic tracking using a priority position identifying method with Bluetooth (registered trademark) in step S402.

In step S403, the tracking control unit 218 performs tracking processing with Bluetooth (registered trademark) as the priority position identifying method. In FIG. 5, the details of the processing will be described.

In step S404, the tracking control unit 218 determines whether or not the position identifying method by human body detection using video analysis is set as the priority position identifying method. If the position identification by human body detection is set as the priority position identifying method, the process proceeds to step S405. If the result is "NO", the process proceeds to step S406.

Figure 6:
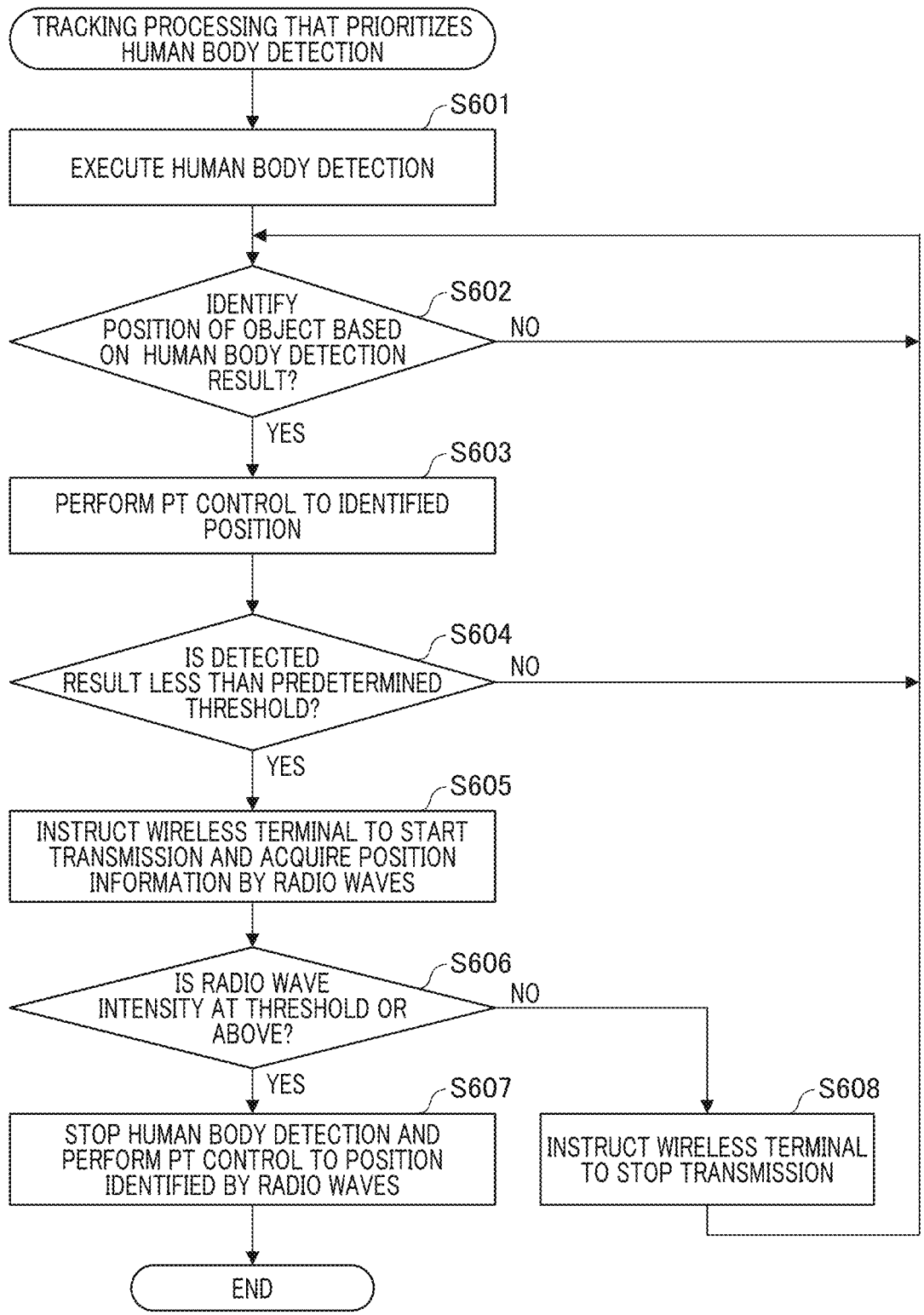
FIG. 6 is a flowchart showing an example of automatic tracking using the priority position identifying method by human body detection in step S405.

In step S405, the tracking control unit 218 performs tracking processing by using the position identifying method based on human body detection using video image analysis as the priority position identifying method. In FIG. 6, the details of the processing will be described.

In step S406, the tracking control unit 218 determines whether to continue automatic tracking by position identification. When it determines to not end the automatic tracking, the process returns to step S402. When it determines to end the automatic tracking, the automatic tracking flow shown in FIG. 4 ends.

The determination method may be based on an end instruction from the client device 102, or the end conditions may be determined in advance. The end condition may be a condition including that, for example, the automatic tracking ends after a predetermined period has passed.

FIG. 5 is a flowchart showing an example of automatic tracking using the Bluetooth (registered trademark) priority position identifying method in step S402. Note that the operation of each step in the flowchart in FIG. 5 is performed by the CPU 212, which serves as the computer in the network camera 101, executing a computer program stored in the storage unit 206.

In step S501, the tracking control unit 218 instructs the wireless terminal 103 to start transmitting position information. In step S502, the radio wave position identification unit 213 acquires radio wave signals from the wireless terminal 103 by the wireless communication processing unit 211 and determines whether or not the position of the wireless terminal has been identified based on the radio wave direction.

Here, step S502 functions as a first detection step of detecting the direction of the radio waves received from the wireless terminal. When the position of the wireless terminal is identified, the process proceeds to step S503. When the position of the wireless terminal is not identified, the process returns to step S502.

In step S503, the PTZ control unit 217 sets the position identified in step S502 to be the PT control position and performs panning/tilting control by issuing PT drive instructions so that the identified position is located at the center of the screen. Here, step S503 functions as a tracking step of controlling the imaging apparatus so that the direction detected by the first detection step is tracked.

Note that, at this time, for example, the distance to the wireless terminal may be estimated according to radio wave intensity and the like, and the zoom may be controlled as necessary. Alternatively, the distance to the object can be measured by using, for example, a stereo camera, a DAF (Dual Pixel Auto Focus) imaging element and a TOF (Time Of Flight) sensor, and the zoom can be controlled as necessary. Alternatively, the zoom may be controlled as necessary by performing measurement using a UWB communication method with high ranging accuracy.

In step S504, the stability determination unit 215 determines whether or not the received radio wave intensity is less than a predetermined threshold (first value). Here, in the stability determination rule for determining the stability, it is determined that radio communication is stable when the received radio wave intensity is a predetermined threshold or above, and it is determined that radio wave communication is unstable when the received radio wave intensity is less than the threshold.

That is, in the first embodiment, the stability is determined based on the intensity of the radio waves detected by the radio wave position identification unit 213 (first detection unit).

Here, step S504 functions as a determination step of determining the stability of detection by the radio wave position identification unit 213 (first detection unit). In step S504, when the radio wave intensity is determined to be less than a threshold (unstable state), the process proceeds to step S505. When the radio wave intensity is at the threshold or above, the stability is determined to be stable, and the process returns to step S502.

In step S505, the position identifying control unit 216 temporarily executes human body detection by image recognition and obtains the human body detection results. At this time, an object (human body) that is present in the latest (immediately previous) direction that has been identified by radio waves is detected.

Subsequently, the object is tracked based on its characteristic and the direction of the object is detected based on the image data. Here, step S505 functions as a second detection step of detecting the direction of the object based on the image data obtained by the imaging unit.

In step S506, the stability determination unit 215 determines whether or not the detection evaluation value for the human body is at a predetermined threshold (a second value) or above. Here, step S506 functions as a determination step of determining the stability of detection by the video image position identification unit 214 (second detection unit).

The detection evaluation value is an evaluation value that indicates the degree of reliability in the detection processing result, when the degree of reliability for the detection is higher, the detection evaluation value typically becomes higher. The detection evaluation value may be at least one of, for example, a size of the object, an object contrast value, a luminance value, a high-frequency component, and the like. This is because detection accuracy decreases when, for example, the size of the object is a predetermined value or less, or when the contrast, luminance, or high-frequency components are low.

Here, when the detection evaluation value is at a predetermined threshold or above, it is determined that human body detection for the human body is stable, and when the detection evaluation value is less than the threshold, it is determined that the detection processing is unstable. When the detection evaluation value is at the threshold or above, the process proceeds to step S507. When the detection evaluation value is less than the threshold, the process proceeds to step S508.

In step S507, the tracking control unit 218 instructs the wireless terminal 103 to stop transmission and sets the position identified by the human body detection in step S505 as the position where PT control is to be performed. Subsequently, the position identification for automatic tracking is performed based on the position of the human body that has been identified by the human body detection in step S505.

That is, the position of the human body that has been identified by the human body detection in step S505 is tracked and pan/tilt control is performed so that the position of the human body is located at the center of the screen. Here, step S507 functions as a tracking step of controlling the imaging apparatus so that the direction that has been detected by the second step is tracked. After the process in step S507 is performed, the flow in FIG. 5 ends.

Thus, steps S502 to S507 function as control steps (control unit) for causing the second detection unit to operate when the stability of detection by the first detection unit is determined to be less than the first value. Furthermore, steps S502 to S507 also function as a control step (control unit) for stopping the operation of the first detection unit when the stability of the second detection unit is determined to be the second value or above.

In step S508, the position identifying control unit 216 stops the execution of human body detection and then the process returns to step S502. Specifically, although the second detection unit is made to operate when the stability of the detection by the first detection unit is determined to be less than the first value, the operation of the second detection unit is stopped when the stability of the second detection unit is determined to be less than the second value.

This is because continued execution in a state in which detection is not stable causes a high processing load, which results in significant amount of wasted processing. As a result, it is possible to reduce the processing load for the position identifying method that is not used in automatic tracking.

As explained above, during the stabilization of position identification by radio waves, the tracking processing is performed on the position based on the radio wave direction. Alternatively, in the case in which position identification by radio waves becomes unstable, when the evaluation value for the human body detection is at a predetermined threshold or above, position identification for the tracking target can be stabilized by switching to human body detection, while suppressing unnecessary switching.

Next, FIG. 6 is a flowchart showing an example of automatic tracking in step S405 using the priority position identifying method based on human body detection. Note that the operation of each step in the flowchart in FIG. 6 is performed by the CPU 212, which serves as the computer in the network camera 101, executing a computer program stored in the storage unit 206.

In step S601, the tracking control unit 218 analyzes the video image and executes human body detection on, for example, a human body (person) that is present in the center of the screen. Alternatively, the characteristics of a human body holding a wireless terminal 103 are registered in advance, and human body detection as to whether or not a human body is present in the screen is executed.

In step S602, it is determined whether or not the video image position identification unit 214 has identified the position of the object based on the human body detection results in the video image analysis unit 208. When the position of the object has been identified, the process proceeds to step S603. When the position of object has not been identified, the process returns to step S602.

In step S603, the PTZ control unit 217 performs pan/tilt control so that the position of the human body (person) is located at the center of the screen by issuing PT drive instructions to a person located at the position identified in step S602, and consequently, tracking is performed.

Note that in addition to pan/tilt control, for example, it may also be possible to estimate a distance to the object according to the size of the human body frame obtained by the human body detection result, and to control the zoom according to necessity. Alternatively, as described above, it may also be possible to measure the distance to the object by using, for example, a stereo camera, a DAF imaging element, a TOF sensor, and a UWB communication system, and to control the zoom according to necessity.

In step S604, the stability determination unit 215 determines whether or not the detection result by human body detection is less than a predetermined threshold. When the detection result is less than the threshold, it is determined the state is unstable and the process proceeds to step S605. When the detection result is at the threshold value or above, it is determined that the state is stable, and the process returns to step S602.

In step S605, the position identifying control unit 216 temporarily issues a transmission instruction to the wireless terminal 103 and acquires position information by radio waves from the wireless terminal 103.

In step S606, the stability determination unit 215 determines whether or not the radio wave intensity from the wireless terminal 103 is at a threshold or above. When the radio wave intensity is at the threshold or above, the process proceeds to step S607. When the radio wave intensity is not at the threshold or above, the process proceeds to step S608.

In step S607, the tracking control unit 218 stops human body detection and sets the position identified by the radio waves as the position at which PT control is to be performed. Accordingly, during the position identification for automatic tracking, PT control is performed based on the position identified by the radio direction from the radio terminal. Subsequently, the process of the flow in FIG. 6 ends.

In step S608, the position identifying control unit 216 instructs the wireless terminal 103 to stop transmission, and the process returns step S602. This is because continuous execution in a state in which the radio wave intensity is low and the position identification is not stable causes a high processing load resulting in a significant amount of wasted processing.

As explained above, in the first embodiment, during the stabilization of position identification by human body detection, the tracking processing is performed in accordance with the position based of the human body detection result. Alternatively, in the case in which position identification by human body detection is unstable, when the radio wave intensity is a predetermined threshold or above, switching to position identification by radio waves is performed, and consequently, position identification for the tracking target can be stabilized while suppressing unnecessary switching.

FIG. 7A to 7F are schematic diagrams showing the transitions during the control of execution of the position identifying method in the first embodiment, and the processing of the position identifying method shown in FIG. 5 and FIG. 6 will be described with reference to FIGS. 7A to 7F.

In FIG. 7A to 7F, reference numeral 702 denotes a position identified by the radio wave position identification unit 213 (hereinafter, referred to as a "radio wave position") and reference numeral 703 denotes a position detected by the video image position identification unit 214 (hereinafter, referred to as a "detected position"). Additionally, the solid rectangle indicates the case in which the position identification is stable, and the dotted rectangle indicates the case in which the position identification is unstable.

Figure 7A:
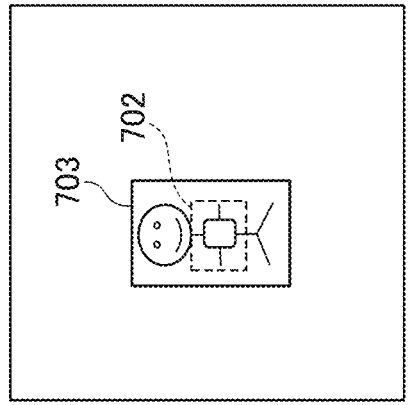
FIGS. 7A to 7F are schematic diagrams showing the transitions during the execution control of the position identification method in the first embodiment of the present invention.

FIG. 7A shows the radio wave position 702 in a state in which position identification by radio waves is stable (the state of "NO" in step S504). Reference numeral 106 denotes the object that holds the wireless terminal 103.

Figure 7B:
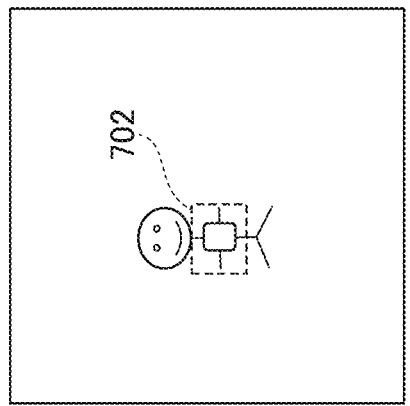
Figure 7C:
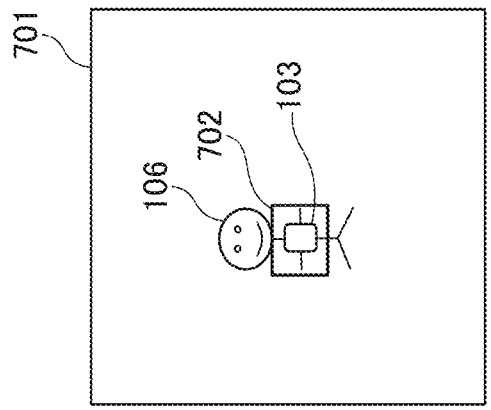

FIG. 7B shows the state in which position identification by radio waves becomes unstable (the state of "YES" in step S504). In this case, the process proceeds to step S505, and human body detection is temporarily executed. FIG. 7C shows the state in which position identification by human body detection is stable (the state of "YES" in step S506).

Figure 7D:
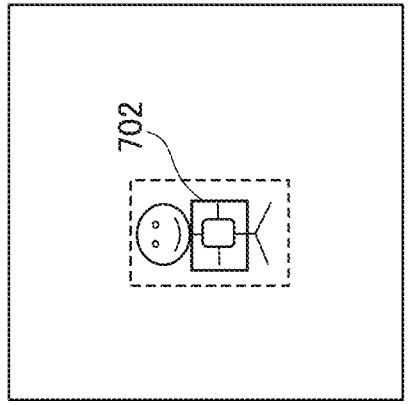

Next, FIG. 7D shows the state in which position identification by human body detection becomes stable as the result of performing tracking using position identification by human body detection (the state of "NO" in step S604).

Figure 7E:
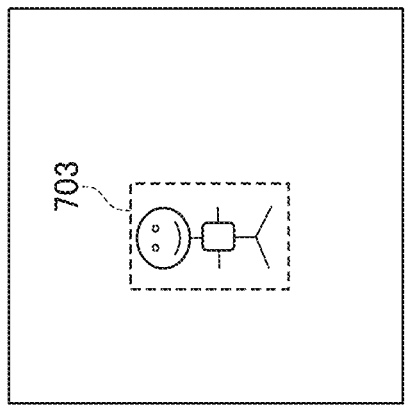
Figure 7F:
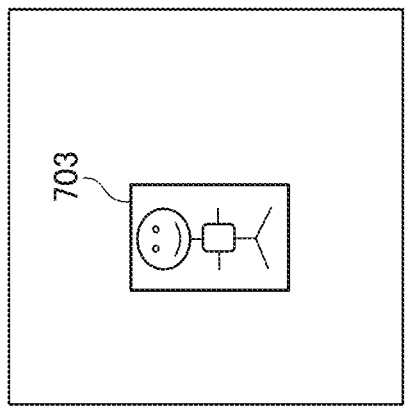

FIG. 7E shows the state in which position identification by human body detection is unstable (the state of "YES" in step S604), and, in step S605, the position identification by radio waves starts. FIG. 7F shows the state in which position identification by radio waves is stable (the state of "YES" in step S606), and the process proceeds to step S607, in which human body detection is stopped, panning/tilting is controlled to the position of the position that has been identified by radio waves, and the state of FIG. 7A is obtained.

As described above, in the first embodiment, when the position characteristics of one of position identification by radio waves or position identification by human detection becomes unstable, the opposite position identification begins. When the other opposite position identification can be detected stably, the position identification that has been originally used is stopped and switched to the opposite position identification.

Therefore, it is possible to stabilize the position identification of the tracking target while suppressing unnecessary switching. As a result, the occurrence of tracking lost for the object 106 can be reduced and the accuracy of automatic tracking can be improved.

In step S504 or step S606, although the radio wave stability is determined based on whether or not the radio wave intensity from the wireless terminal 103 is at a predetermined threshold or above, the determination may be performed with the frequency at which radio waves from the wireless terminal 103 are received. Specifically, when the frequency of reception of radio waves from the wireless terminal 103 is at a predetermined threshold or above, it may be determined that the stability is stable, and when the frequency of reception of radio waves from the wireless terminal 103 is less than a predetermined threshold, it may be determined that the stability is unstable.

Thus, the stability of the direction detected by the first detection unit may be determined based on the frequency of reception of radio waves detected by the first detection unit. It is desirable that the threshold in step S606 is set higher than the threshold in step S504.

Similarly, in step S506 or step S604, although the stability of human body detection is determined depending on the magnitude of the detection evaluation value, it may also be determined depending on the number of consecutive undetected frames and the like. Specifically, when the number of undetected frames is less than a predetermined threshold, it may be determined that the stability is stable, and when the number of undetected frames is at a predetermined threshold or above, it may be determined that the stability is unstable.

Thus, the stability in the direction detected by the second detection unit may be determined based on the detection frequency of the object detected by the second detection unit (For example, the ratio of the number of detected frames and the number of undetected frames). Note that it is desirable that the threshold in step S604 is set lower than the threshold in step S506.

Additionally, in the case in which the result in step S504 is "YES", that is, when the position identification by radio waves becomes unstable, control may be performed to avoid human body detection being immediately performed when the speed of the object 106 is a predetermined speed or higher. This is because when the object 106 is moving at a high speed, there is a high probability that the object 106 is moving sideways, which reduces the accuracy in terms of human body detection characteristics.

Additionally, when the object 106 is moving at a high speed, the influence of radio frequency interference by such as obstacles is avoided, and consequently, the radio wave intensity may be enhanced. Hence, when the moving speed of the object is faster than a predetermined speed, it is desirable that human body detection is not executed immediately.

Specifically, in the case in which the stability of detection by the first detection unit is determined to be less than the first value, when the moving speed of the object is faster than a predetermined speed, it is desirable that the second detection unit is not activated.

Furthermore, although the wireless communication standard used in the first embodiment is Bluetooth (registered trademark) version 5.1, any version may be used if a direction detection function is provided. That is, Bluetooth (registered trademark) version 5.2 may also be used.

Additionally, other communication methods, such as UWB, can also be used for wireless position identification in the first embodiment if they are provided with a direction detection function based on the AoA or AoD methods using a plurality of antennas as described above.

Second Embodiment

In the first embodiment, in the case in which the position identification by radio waves becomes unstable, when the detection evaluation value for the human body detection is at a predetermined threshold or above, switching control is performed. However, when a person other than the tracking target appears in the video image, there is a probability that the stability of the human body detection method will be determined based on the detection evaluation value for a person who is not the original tracking target.

Accordingly, in the second embodiment, a description will be given of a method for improving the determination accuracy of the stability of position identification by human body detection, assuming the case in which a plurality of human body detection results including detection results other than those for the tracking target are detected.

Figure 8:
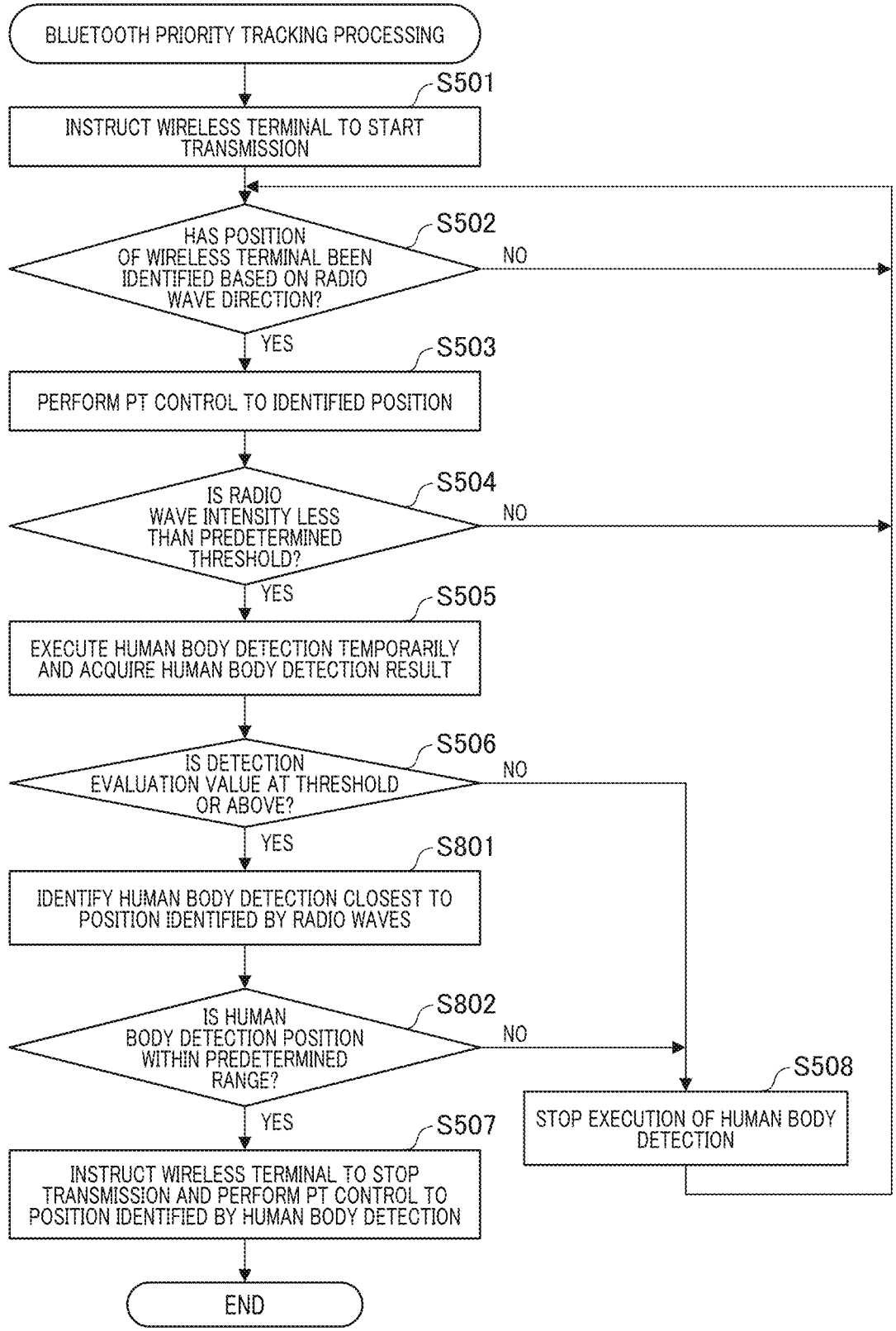
FIG. 8 is a flowchart showing the flow of processing for improving the accuracy of stability determination by human body detection according to the second embodiment.

FIG. 8 is a flowchart showing the flow of processing for improving the accuracy of stability determination by human body detection according to the second embodiment. Note that the operation of each step in the flowchart in FIG. 8 is performed by the CPU 212, which serves as the computer in the network camera 101, executing a computer program stored in the storage unit 206. Note that since steps for which the reference numerals that are the same as those in FIG. 5 are provided perform the same processing, explanations thereof will be omitted.

In step S801, when the detection evaluation value is determined to be at a predetermined threshold or above ("YES" in step S506), the position identifying control unit 216 identifies the human body detection result closest to the position identified by radio waves.

For this purpose, the position identifying control unit 216 obtains the latest position from among the positions identified by radio waves from the radio wave position identification unit 213 and obtains the coordinates of each of the human body detection results from the video image position identification unit 214. Subsequently, the relative distance of each position is compared within a two-dimensional coordinate space, and the coordinates of the closest human body detection result are used as the human body detection result.

In step S802, the position identifying control unit 216 determines whether or not the position by human body detection identified in step S801 is within a predetermined range. The predetermined range is, for example, a rectangular region with a predetermined size around the latest direction (position) identified by radio waves.

Then, in the two-dimensional coordinates of the image frame, when the center of gravity of the human body detection identified in step S801 is present within the rectangular region (within a predetermined range), it is determined that there is high probability that the person identified by radio waves and the person identified by the human body detection are the same person.

Subsequently, the process proceeds to step S507, the direction of the object detected by human body detection is detected based on the image data, and the pan/tilt control of the imaging apparatus is performed so that the direction is tracked. In contrast, in step S802, when the center of gravity of the human body detection is not within the predetermined range, it is determined that the probability that the persons are the same person is low, and the process proceeds to step S508.

Here, additional description will be given of the execution control processing for the position identification method in FIG. 8, with reference to FIG. 9. Here, FIGS. 9A to 9D are drawings for explaining the processing for improving the accuracy of stability determination in the first embodiment.

Figure 9A:
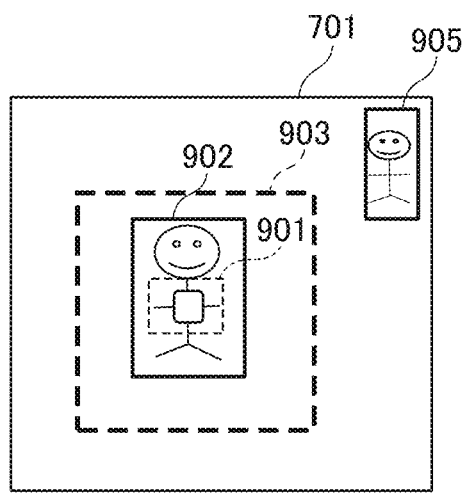
FIGS. 9A to 9D are drawings for explaining the processing for improving the accuracy of stability determination in the first embodiment.
Figure 9B:
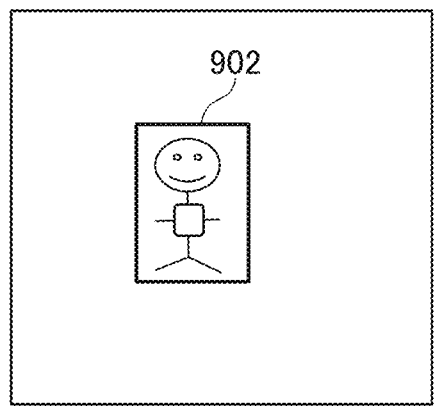
Figure 9C:
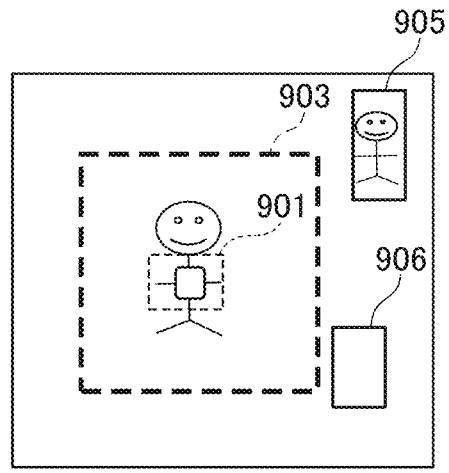
Figure 9D:
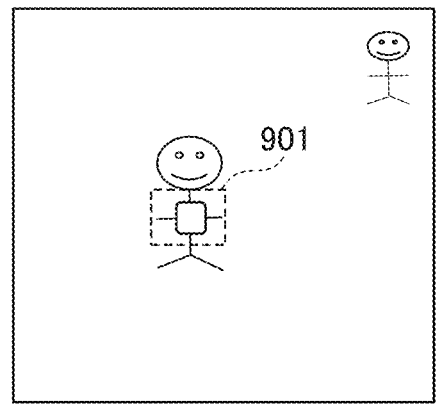

In FIGS. 9A and 9B, examples of cases in which the human body detection result closest to the position identified by radio waves falls within a predetermined range are shown, and, in FIGS. 9C and 9D, examples of cases in which it does not fall within the predetermined range are shown.

In FIG. 9A, a state in which, in steps S503 to S505 in FIG. 8, the radio position 901 becomes unstable, and, in step S506, a detection position 902 and a detection position 905 are captured as stable positions is shown.

Next, in step S801, the position closest to the radio position 901 identified by the radio waves is identified as the detection position 902. Reference numeral 903 denotes a rectangular region of a predetermined range around the radio position 901, and in step S802, it is determined whether or not the detection position 902 that is a human body detection result is within the rectangular region 903.

FIG. 9B shows the state in which, in step S802, the detection position 902 is determined to be within the predetermined range and, in step S507, the position identification method is switched from radio waves to human body detection results. In this state, the detection position 902 identified by human body detection is set as the position where PT control is performed, and the pan/tilt control is performed so that this detection position 902 is located at the center of the screen.

In contrast, FIG. 9A shows the state in which the radio position 901 becomes unstable through steps S503 to S505, and, in the detection position 905 and a detection position 906, detection evaluation values are determined to be at a threshold or above by human body detection.

In step S801, the detection position 906 is identified as the position closest to the radio position 901 identified by radio waves. Subsequently, in step S802, it is determined whether the detection position 906 is not within the rectangular region 903. FIG. 9D shows the state in which, in step S508, the execution of human body detection is stopped.

As described above, in the second embodiment, in determining the stability of the human body detection, results that have been detected at a position completely separated from the object to be tracked are excluded due to the presence of a plurality of persons within the screen or the erroneous detection of the human body detection itself, and consequently, erroneous determinations for the stability determination can be reduced. Additionally, the position identification for the tracking object can be stabilized while suppressing unnecessary switching of the position identification method.

As a result, the occurrence of lost tracking for the object 106 can be suppressed and the accuracy of automatic tracking can be improved. Note that, in the second embodiment, although step S801 is performed after step S506, step S801 may be performed, for example, between steps S505 and S506.

Third Embodiment

In the embodiments as described above, an example has been explained in which when, in step S506, the stability determination of human body detection, in other words, the detection evaluation value, is less than a threshold, it is determined that the human body detection is not stable and, in step S508, the execution of human body detection is stopped. In this case, in the third embodiment, the detection evaluation value is increased by zooming-in before stopping the execution of human body detection.

Figure 10:
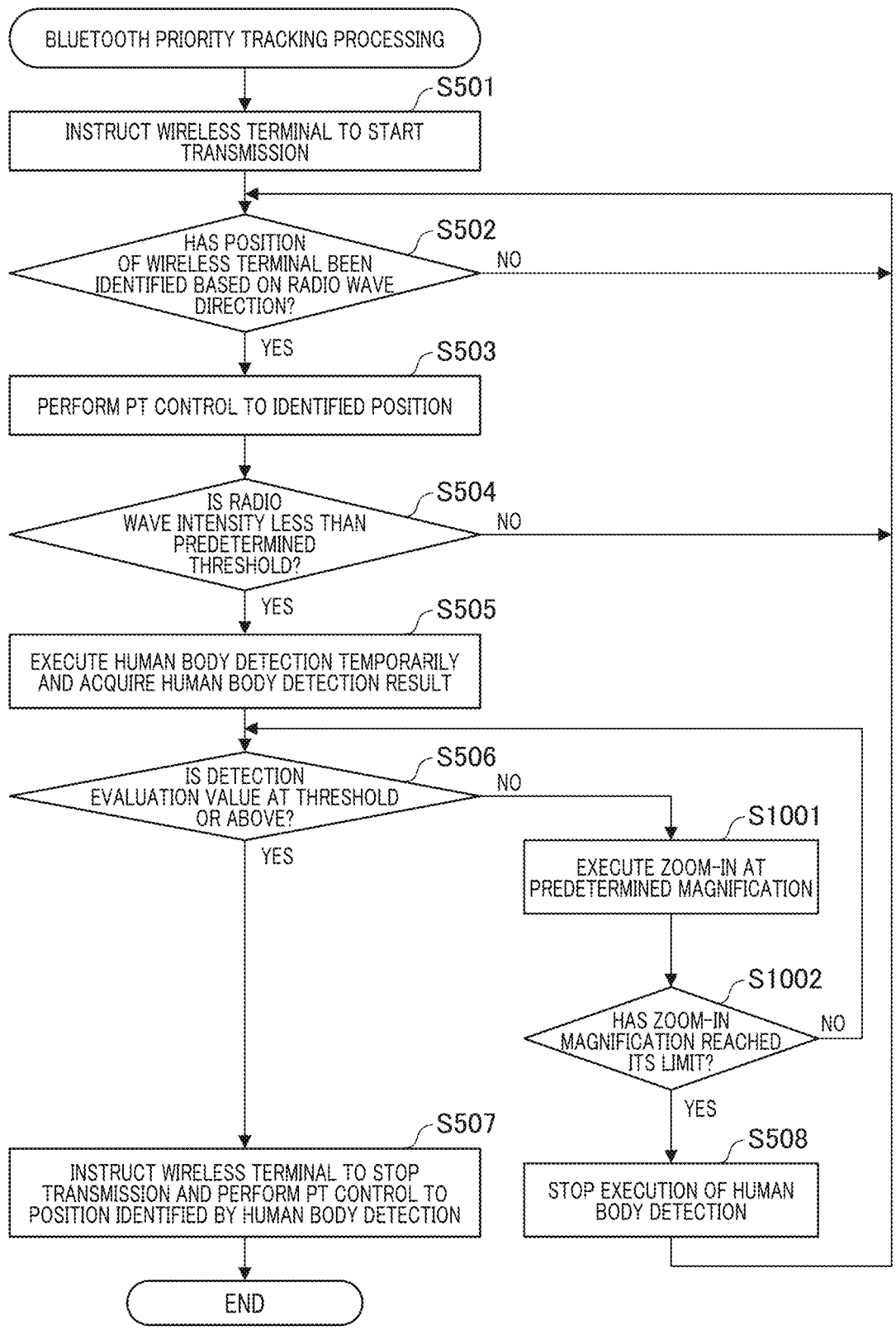
FIG. 10 is a flowchart for improving the accuracy of stability determination in human body detection according to the third embodiment.

FIG. 10 is a flowchart showing a processing for improving the accuracy of stability determination in the human body detection according to the third embodiment. Note that the operation of each step in the flowchart in FIG. 10 is performed by the CPU 212, which serves as the computer in the network camera 101, executing a computer program stored in the storage unit 206. Note that since steps for which reference numerals that are the same as those in FIG. 5 are provided perform the same processes, explanations thereof will be omitted.

In step S1001, when the detection evaluation value is determined to be less than a threshold (the case of "NO" in step S506), the position identifying control unit 216 executes zoom-in at a predetermined magnification by the PTZ control unit 217.

The predetermined magnification is a preset zoom magnification, and, in the third embodiment, a plurality of stages of zoom-in up to the zoom limit is executed. Specifically, when the stability of the second detection unit is determined to be less than the second value, control is performed so as to increase a zoom magnification of the imaging apparatus.

In step S1002, the position identifying control unit 216 determines whether or not the predetermined zoom-in magnification executed in step S1001 has reached the limit. If the predetermined zoom-in magnification has reached the limit, the process proceeds to step S508.

In contrast, if the predetermined zoom-in magnification has not reached the limit, the process returns to step S506 in which the detection evaluation value is evaluated. When the detection evaluation value of human body detection is at a predetermined threshold or above before the result becomes "NO" in step S1002, the result becomes "YES" in step S506, and the process proceeds to step S507.

FIGS. 11A to 11C are drawings for explaining the operation of the processing for improving the accuracy of stability determination in human body detection according to the third embodiment.

FIG. 11A illustrates the case in which when, in step S504, the result is "NO", and in step S505, the human body detection is temporarily executed, however, in step S506, the detection evaluation value for the human body detection is determined to be less than the predetermined threshold. Reference numeral 106 denotes an object, reference numeral 702 denotes a radio wave position, and reference numeral 1101 denotes a detection position 1101 that has been detected by human body detection.

In FIG. 11A, the states of both the radio wave position 702 and the detection position 1101 are unstable. FIG. 11B illustrate the state of zoom-in by a predetermined magnification through steps S1001 and S1002, and this state shows that it is determined that the detection evaluation value that has been detected again in S506 is still less than the threshold.

FIG. 11C shows a stable state in which as the result of additional zoom-in performed in step S1101, during step S506, the detection evaluation value for human detection is at a predetermined threshold or above. Subsequently, the process proceeds to step S507, in which position identification by radio waves is stopped and PT control is performed so that the position identified by human body detection is located at the center of the screen.

As described above, according to the third embodiment, it is possible to improve the stability of the detection position even when the states of both the detection position 1101 and the radio wave position 702 are unstable as shown in FIGS. 11A and 11B. Therefore, it is possible to stabilize the position identification for the tracking target while suppressing unnecessary switching of position identification methods. As a result, the occurrence of lost tracking for the object 106 can be suppressed and the accuracy of automatic tracking can be improved.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging apparatus through a network or various storage media. Then, a computer (or a CPU, an MPU, or the like) of the imaging apparatus may be configured to read and execute the program. In such a case, the program and the storage medium storing the program configure the present invention.

This application claims the benefit of Japanese Patent Application No. 2022-070224, filed on Apr. 21, 2022, which is hereby incorporated by reference herein in its entirety.

What is claimed is:

1. An imaging apparatus capable of communicating with a wireless terminal held by an object, the imaging apparatus comprising:
   at least one processor or circuit configured to function as:
   a first detection unit configured to detect a position of the wireless terminal based on a direction of radio waves received from the wireless terminal held by the object;
   a second detection unit configured to detect a position of the object based on image data obtained by an imaging unit;
   a tracking unit configured to control the imaging apparatus so that a position detected by the first detection unit or the second detection unit is tracked;
   a determination unit configured to determine a stability of detection by the first and second detection units; and
   a control unit configured to, if the stability of detection by one detection unit from among the first and the second detection units is determined to be less than a first value by the determination unit, cause the other detection unit to operate, and configured to stop the operation of the one detection unit if the stability of the other detection unit is determined to be a second value or above by the determination unit.

2. The imaging apparatus according to claim 1, wherein the tracking unit controls panning or tilting of the imaging apparatus.

3. The imaging apparatus according to claim 1, wherein if the stability of detection by the first detection unit is determined to be less than the first value by the determination unit, the second detection unit detects a position of the object that is present in the latest position that has been detected by the first detection unit, based on the image data.

4. The imaging apparatus according to claim 3, wherein if the stability of detection by the first detection unit is determined to be less than the first value by the determination unit, the second detection unit detects a direction of the object that is present within a predetermined range around the latest direction detected by the first detection unit, based on the image data.

5. The imaging apparatus according to claim 4, wherein, in the case in which the stability of detection by the first detection unit is determined to be less than the first value by the determination unit, if the object detected by the second detection unit is present within a predetermined range around the latest position detected by the first detection unit, the tracking unit controls the imaging apparatus so that a position of the object detected by the second detection unit is tracked.

6. The imaging apparatus according to claim 1, wherein if the stability of detection by the first detection unit is determined to be less than the first value by the determination unit, the second detection unit is operated, and if the stability of the second detection unit is determined to be less than the second value by the determination unit, the operation of the second detection unit is stopped.

7. The imaging apparatus according to claim 1, wherein if the stability of detection by one of the first and second detection units is determined to be less than the first value by the determination unit, the control unit causes the other detection unit to operate, and if the stability of the other detection unit is determined to be less than the second value by the determination unit, the control unit stops the operation of the other detection unit.

8. The imaging apparatus according to claim 1, wherein if the stability of detection by the first detection unit is determined to be less than the first value by the determination unit, the control unit causes the second detection unit to operate, and if the stability of the second detection unit is determined to be less than the second value by the determination unit, the control unit increases a zoom magnification of the imaging apparatus.

9. The imaging apparatus according to claim 1, wherein, in the case in which the stability of detection by the first detection unit is determined to be less than the first value by the determination unit, if a moving speed of the object is faster than a predetermined speed, the control unit does not cause the second detection unit to operate.

10. The imaging apparatus according to claim 1, wherein if the stability of detection by the first detection unit is determined to be less than the first value by the determination unit, the control unit causes the second detection unit to operate, and if the stability of the second detection unit is determined to be the second value or above, the control unit stops the operation of the first detection unit.

11. The imaging apparatus according to claim 10, wherein, the determination unit determines the stability based on an intensity of a radio wave detected by the first detection unit.

12. The imaging apparatus according to claim 10, wherein, the determination unit determines the stability in a position detected by the first detection unit based on reception frequency of the radio wave detected by the first detection unit.

13. The imaging apparatus according to claim 10, wherein the second detection unit detects a position of the object by detecting a body of the object, a face of the object, or a moving body.

14. The imaging apparatus according to claim 10, wherein the determination unit determines the stability in a position detected by the second detection unit based on detection frequency of the object detected by the second detection unit.

15. A control method for controlling an imaging apparatus capable of communicating with a wireless terminal held by an object, the control method comprising:
   first detecting in which a position of the wireless terminal based on a direction of radio waves received from the wireless terminal held by the object is detected;
   second detecting in which a position of the object is detected based on image data obtained by an imaging unit;
   tracking in which the imaging apparatus is controlled so that a position detected in the first detecting or the second detecting is tracked; and
   determining in which stability of detection by the first detecting and second detecting is determined,
   wherein if, in the determining, the stability of detection by one detecting from among the first detecting and the second detecting is determined to be less than a first value, the other detecting is operated, and if the stability of the other detecting is determined to be a second value or above, the operation of the one detecting is stopped.

16. A non-transitory computer-readable storage medium configured to store a computer program comprising instructions for executing the following processes:
   first detecting in which a position of the wireless terminal based on a direction of radio waves received from the wireless terminal held by the object is detected;
   second detecting in which a position of the object is detected based on image data obtained by an imaging unit;
   tracking in which the imaging apparatus is controlled so that a position detected in the first detecting or the second detecting is tracked; and
   determining in which stability of detection by the first detecting and second detecting is determined,
   wherein if, in the determining, the stability of detection by one detecting from among the first detecting and the second detecting is determined to be less than a first value, the other detecting is operated, and if the stability of the other detecting is determined to be a second value or above, the operation of the one detecting is stopped.

* * * * *